Feb. 20, 1962 E. V. SCHNEIDER 3,022,460
METER AND BRAKE THEREFOR
Filed April 13, 1955 2 Sheets-Sheet 1
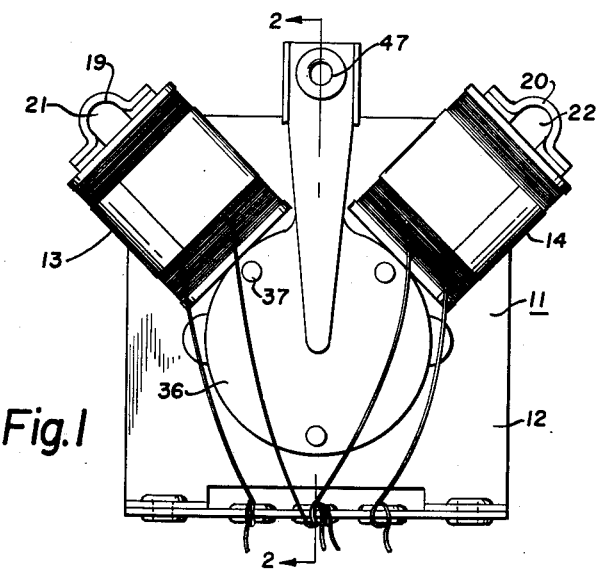
INVENTOR.
EMMOR V. SCHNEIDER

INVENTOR.
EMMOR V. SCHNEIDER

United States Patent Office 3,022,460
Patented Feb. 20, 1962

3,022,460
METER AND BRAKE THEREFOR
Emmor V. Schneider, Alliance, Ohio, assignor, by mesne assignments, to The Alliance Manufacturing Company, Division of Consolidated Electronics Industries Corporation, Alliance, Ohio, a corporation of Delaware
Filed Apr. 13, 1955, Ser. No. 501,030
6 Claims. (Cl. 324—140)

The invention relates in general to electrical meters and more particularly to a specific structural form and circuit arrangement of the meter and associated circuits which establishes near linearity of scale movement for a wide angular movement and which permits the use of a friction brake to hold the indicator needle in any position upon de-energization of the meter.

Electrical meters take a wide variety of form and in general utilize some electric energy to establish a magnetomotive force which coacts with a movable coil or vane so that the force causes a movement of the coil or vane in proportion to the voltage or current applied. Many such meters have as an opposing force some form of a spring which moves the needle back to an initial or zero position when the electrical energy is removed.

An object of the invention is to provide a meter which will measure variations in a measurable quantity of a device, yet be insensitive to voltage variations of a voltage source supplying energy to the device having the measurable quantity.

Another object of the invention is to provide a friction brake for a meter so that the brake is removed when the meter is energized and in operation; and when the meter is de-energized, the brake is actuated to hold the needle or other indicating part of the meter in the previously established position.

Another object of the invention is to provide a meter having a coil to establish a variable force in accordance with the variable quantity to be measured and to provide an opposing force in opposition thereto which opposing force is removed when energization to the meter is interrupted, so that there is no further tendency for movement of the meter indicator needle when the energization to the meter ceases.

Another object of the invention is to provide a meter with first and second opposing magnetomotive forces, each acting on a permeable movable vane and tending to move this vane in opposite rotational directions and to provide the meter with a braking system wherein the opposing magnetomotive forces are actually combined in addition to move the vane in a third direction different from either of the aforementioned opposing directions.

Another object of the invention is to provide a meter which may be used as a remote indicator for the position of a movable device at a remote location with the movable device utilizing electrical energy and with a potentiometer in circuit and movable therewith so that the potentiometer in combination with two different coils of the meter form a modified bridge circuit, which may be used to establish forces to move an indicator needle.

Another object of the invention is to provide a meter having two coils establishing magnetomotive forces in opposition which establish forces in a movable permeable vane of the meter wherein the entire circuit construction is such as to give a wide angle of indicator needle movement which is very nearly linear with the quantity to be measured throughout its entire range.

Other objects and a fuller understanding of this invention may be had by referring to the following description and claims, taken in conjunction with the accompanying drawings, in which:

FIGURE 1 is a rear view of the entire meter;

FIGURE 2 is a longitudinal sectional view through the meter on the line 2—2 of FIGURE 1;

FIGURE 3 is a front view of the meter;

FIGURE 4 is a rear view with parts broken away to show the internal construction;

FIGURE 5 is a bottom view of a modified form of meter;

FIGURE 6 is an end view of the meter of FIGURE 5;

Figure 8:
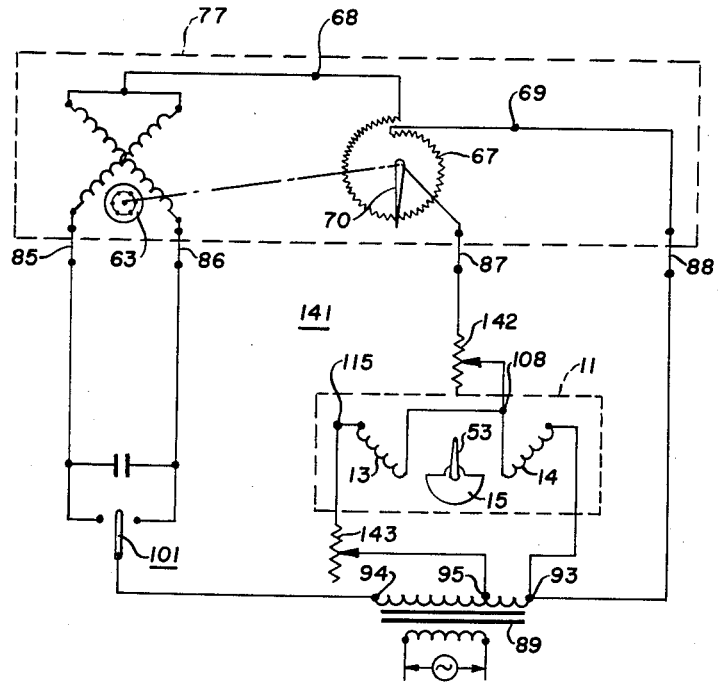
FIGURE 8 is a schematic diagram of an alternative circuit arrangement.

The FIGURES 1 to 4 show the physical details of the construction of the meter 11 which includes generally a sheet metal magnetically permeable frame 12, coils 13 and 14, and a movable permeable vane 15 which cooperates with coils 13 and 14. The frame may have any shape desired and has been shown as having a generally flat body 18 for ease in mounting arrangements. Ears 19 and 20 are bent generally at right angles to the body 18 to hold one end of permeable core portions 21 and 22. A non-permeable body 23 is mounted on the frame 12 in any suitable manner such as by the peened lugs 24. In this case, the body 23 is made of die-cast zinc for ease in manufacture and ease in holding manufacturing tolerances, although it may be made of any desired material and made in any suitable manner. The body 23 has an annular ring portion 25 and a flat disc portion 26. The disc portion 26 is adjacent the frame 12 and has a central shaft aperture 27 and an eccentrically disposed tongue aperture 28. A sheet metal tongue 29 is formed in a central aperture 30 in the body portion 18 and this tongue 29 is bent generally at right angles to extend through the tongue aperture 28 in the flat disc 26.

The core portions 21 and 22 have first and second permeable pole shoes 34 and 35 connected to the respective core portions, and these pole shoes are mounted on the face of the annular ring portion 25 which is remote from the frame 12. A non-permeable support 36 is mounted to the pole shoes 34 and 35 and may be so mounted by the same means which hold the pole shoes to the annular ring portion 25 which again may be peened lugs 37. The support 36 may also act as a cover for the vane 15. The pole shoes 34 and 35 are preferably laminated for operation on alternating current and subscribe approximately one hundred seventy degrees of arc on the annular ring portion 25. The core portions 21 and 22 extend at approximately ninety degrees relative to each other and generally parallel to the frame 12. The pole shoes gradually taper to narrower toe portions 38 and 39.

The vane or permeable movable member 15 has a first and a second semicircular portion 42 and 43 with the first semicircular portion being of considerably smaller radius than the second portion. Both portions are symmetrical about a shaft 44 on which the vane is fixedly attached. The shaft is journalled in the central shaft aperture 27 in the body 23 and in another shaft aperture 45 in the non-permeable support 36. It is so journalled so as to permit axial movement as well as rotational movement. A leaf spring 46 is fastened to the non-permeable support 36 as by the rivet 47, and the lower end of the leaf spring engages the rear end of the shaft 44 to move it axially so that the semicircular vane portion 43 frictionally engages a shoulder 48 formed in the annular ring portion 25. The shoulder 48 is approximately two hundred seventy degrees in extent between first and second stops 51 and 52 which are generally adjacent the core portions 21 and 22. Because the periphery of the second vane portion 43 is about one hundred eighty degrees of arc, these stops 51 and 52 permit approximately a ninety degree rotation of the vane 15. The tongue 29 extends to a position adjacent the first vane portion 42 so as to form a magnetic path between the vane 15 and the frame 12 through the agency of the tongue 29.

The FIGURE 2 especially shows that with the spring 46 urging the vane 15 against the shoulder 48, the vane 15 is to the right of the median plane of the laminated pole shoes 34 and 35. The shaft 44 and vane 15 has enough axial movement to permit the vane to be moved into the median plane through the mid-portion of the pole shoes 34 and 35 against the urging of the spring 46. A meter needle 53 has been shown as one form of an indicator which may be attached to the shaft 44 for rotation therewith to give the meter indication.

Figure 7:
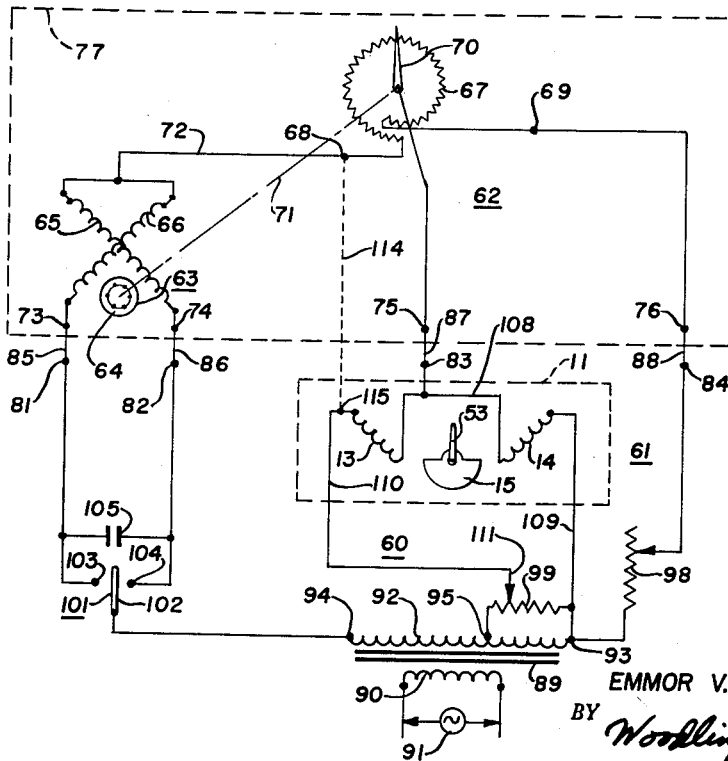
FIGURE 7 is the preferred circuit arrangement of the meter in a remote indicating circuit.

The FIGURE 7 shows a circuit in which the meter 11 may be used. This may be a remote indicator circuit 60, wherein the meter 11 is at a first location or remote indicator location 61 to indicate a position of a movable device at a second location 62. The movable device has been shown as an electric motor 63 which in this case is a reversible two-phase induction motor having a rotor 64 and first and second phase windings 65 and 66. A potentiometer 67 is also at the second location 62 and has first and second end terminals 68 and 69 and a movable blade contact 70 connected at 71 to be operated in accordance with movement of the electric motor 63. First ends of the motor windings 65 and 66 are interconnected and connected by a common lead 72 to terminal 68, and the other ends of the windings are connected to terminals 73 and 74. The movable blade contact 70 is connected to a terminal 75 and the potentiometer end terminal 69 is connected to a terminal 76. All of these parts with reference numerals from 63 to 76 may be located at the second location 62.

One use for such a meter 11 is to indicate the position of an antenna, such as a television receiving antenna, which is rotated by an antenna rotator device 77 utilizing the motor 63 as a power source. The potentiometer 67 is connected in the antenna rotator device so that the movable blade contact 70 moves in accordance with the antenna rotation for a three hundred sixty degree rotation of the antenna. To permit this three hundred sixty degree rotation of the movable blade contact 70, the potentiometer 67 may be in the form of a slight spiral with overlapping ends as shown in this FIGURE 7.

The first location 61 may be a control station as well as a remote indicator station for control of the reversible motor 63 and to indicate the position of the motor and/or the antenna rotated thereby. This is one illustration of the use of this meter 11 and in such case the remote indicator position may have first, second, third, and fourth terminals 81, 82, 83, and 84 which are adapted to be connected to the terminals 73, 74, 75, and 76 by conductors 85, 86, 87, and 88 respectively. At the remote indicator position 61, a supply transformer 89 is provided which has a primary winding 90 adapted to be energized from an alternating current source 91. The transformer 89 also has a secondary 92 which may be a low voltage winding for safety, and this secondary winding 92 is shown as provided with first and second end terminals 93 and 94 and an intermediate terminal 95. A calibrating potentiometer 98 is connected between the terminals 93 and 84, and a balancing potentiometer 99 is connected between the terminals 93 and 95. A single-pole double-throw reversing switch 101 has a switch blade 102 and first and second contacts 103 and 104 engageable by the switch blade 102. A condenser 105 to provide out-of-phase voltages to the phase windings 65 and 66 is connected across the contacts 103 and 104 which are connected to the terminals 81 and 82, respectively.

The meter 11 is shown in an elementary nature in FIGURE 7 and shows coils 13 and 14 connected in series by a conductor 108. The other end of the coil 14 is connected by a conductor 109 to the terminal 93, and the other end of the coil 13 is connected by a conductor 110 to the slider 111 on the balancing potentiometer 99. The vane 15 and meter needle 53 have been elementarily shown in FIGURE 7.

*Operation*

The operation of the meter of FIGURES 1 to 4 may best be understood by an explanation of the operation of the circuit 60 of FIGURE 7. The meter 11 is designed to work in a form of a bridge circuit which is best explained if one initially assumes that a conductor represented by the dotted line 114 is present in the circuit interconnecting the terminal 68 of the potentiometer 67 and the terminal 115 which is an end terminal of the meter coil 13. If this conductor 114 were present, it would be noted that the two halves of the potentiometer 67 on either side of the movable blade contact 70 in conjunction with the meter coils 13 and 14 from a bridge circuit energized by the balancing potentiometer 99. With the movable blade contact 70 in the position shown; namely, in the mid-point of the potentiometer 67 and neglecting the resistance of the conductors and the calibrating potentiometer 98, there would be equal energization on the coils 13 and 14. Referring now to FIGURES 1 to 4, this energization of the coils 13 and 14 establishes the pole shoes 34 and 35 of opposite polarity, because of the way the coils are wound or connected.

The magnetic flux established by each of the coils 13 and 14 follows separate paths. The flux from coil 13 travels through a series loop path comprising the core 21, pole shoe 34, air gap 116, vane 15, air gap 118, tongue 29, frame 12, and ear 19 to return to the core 21. At the same instant, flux from the coil 14 travels through a series loop path comprising the core 22, ear 20, frame 12, tongue 29, air gap 118, vane 15, air gap 117, and pole shoe 35 to return to the core 22. The tongue 29 thus establishes a leakage flux path along the magnetic neutral axis of the meter frame 12 and vane 15. The flux lines bridging the air gap 116 tend to rotate the vane 15 clockwise, because these flux lines attempt to separate to establish the lowest magnetic impedance or reluctance in the magnetic circuit of coil 13. At the same time the flux lines bridging the air gap 117 tend to rotate the vane 15 counterclockwise to establish the minimum reluctance in the magnetic circuit of coil 14. Coil 14 is thus a means establishing a force opposing that of coil 13 on vane 15. For the aforementioned condition of equal energization of coils 13 and 14, the forces on vane 15 will be equal and balanced, and the vane will be stationary in the position shown in FIGURE 4; namely, where generally equal areas of the vane portion 43 lie opposite the pole shoes 34 and 35. Also in this condition of equal energization of coils 34 and 35, it will be noted that the flux from the coils 34 and 35 will be equal and in opposite directions in the tongue 29, so that the resultant flux therein is zero. Because of this zero or minimum resultant flux in the tongue 29 under this equal energization condition, it will be observed that the flux in the circuit travels substantially across the air gap 116, through the vane 15 and across the air gap 117, and thus the vane 15 links the flux of the coil 13 with that of the coil 14.

When there is unequal energization on coils 13 and 14, with the coil 13 having greater energization, for example, there is a greater flux across air gap 116 than across air gap 117, because the tongue 29 shunts a portion of the flux back to the coil 13 without this flux traversing the core 22 of the coil 14. This greater flux at air gap 116 rotates the vane 15 clockwise to a new angular position where the opposing torques on the vane 15 are equal. Therefore, it will be seen that either equal or unequal energization on the coils 13 and 14 establish magnetomotive forces in opposition and consequently establish forces on opposition in the vane 15, with these forces being in opposite rotational directions. However, the two fluxes at the air gaps 116 and 117 establish additive forces in an axial direction which tend to pull the vane 15 into the median plane of the pole shoes 34 and 35 despite the urging of the spring 46. This is a physical force in a different direction from those tending to cause rotation of said vane. The energization of either of the coils 13 and 14 under the conditions shown is sufficient to establish an axial force great enough to move the vane 15 away from the arcuate shoulder 48 and thus release the frictional braking engagement previously established between the vane 15 and the body 23. With the releasing of this frictional braking engagement the vane 15 is free to rotate in accordance with the relative energization of the coils 13 and 14, and hence the axial force controls the degree of rotational freedom of the vane 15. Upon de-energization of the coils 13 and 14, the leaf spring 46 moves the shaft 44 axially so that the vane 15 re-engages the shoulder 48 to establish the frictional braking engagement. This holds the meter needle 53 in its formerly established rotational position and thus the meter 11 continues to indicate the previously established indicator position even after energization of the meter has ceased. When coil 13 is de-energized, coil 14 is also de-energized, and since it had been establishing an opposing rotative force, the termination of one rotative force is accompanied by the termination of the opposing rotative force. This means that the rotative effect of the opposing force is inhibited or eliminated upon the de-energization of coil 13.

Returning again to the circuit of FIGURE 7, assuming the conductor 114 to be in the circuit and negligible resistance in all conductors, the bridge circuit of the potentiometer 67 and coils 13 and 14 is such that if the potentiometer blade 70 is moved clockwise to the right limit position there will then be maximum energization on the coil 13 and a zero or minimum energization on the coil 14. As seen in FIGURE 4, the meter needle 53 will be moved to its right limit position with the vane portion 43 abutting the stop 51. Conversely, if the potentiometer blade 70 is moved counterclockwise to its limit position, the meter coil 13 will be shorted out and full energization applied to the meter coil 14 to move the meter needle 53 to its left limit position with the vane portion 43 abutting the stop 52.

The antenna rotator device 77 is desired to be rotationally reversible, which requires at least three conductors to the motor, namely, conductors 85, 86, and 88, with the motor energized from the transformer secondary 92 and selectable in rotational direction by the switch contact 102. This selects a particular one of the phase windings 65 and 66 for direct energization, and energization of the other phase winding through the condenser 105 for leading current. Therefore, this causes the selected rotation. The bridge circuit previously described, which had as part thereof the conductor 114, also required three conductors, namely, 114, 87, and 88. When the bridge circuit and the motor energization circuit are combined as shown in FIGURE 7, conductor 88 may serve double duty as a common conductor so that only five conductors are needed. Antenna rotator devices presently on the market, however, are available with only four conductors interconnecting the antenna rotator location and the remote indicator location. Therefore, it is highly desirable to utilize a circuit having only four conductors for interconnecting the two locations yet which provide both the control and indicator functions. The circuit 60 of FIGURE 7 provides this double function of both control and indication with only four conductors 85, 86, 87, and 88, since by use of the particular construction of the meter 11 plus other circuit elements, the conductor 114 is not required.

The conductors 85–88 may be of any length and the length is not determinable at the time of manufacture of the antenna rotator device or at the time of the manufacture of the meter 11 because the length of these conductors will depend upon each particular installation of the customer. Typically, these conductors may be from twenty-five to one hundred twenty-five feet long using No. 18 wire and a motor current which may, for example, be 1.3 amperes, and a secondary voltage of thirty-three volts. The voltage drop in each of the conductors 85, 86, and 88 may be from a .2 to 1.2 volts. Therefore, it will be seen that with a one volt drop in conductor 88, for example, if the potentiometer blade 70 were moved to the clockwise limit, there still would be one volt applied to the coil 14 rather than zero volts as in the ideal bridge circuit previously described. The calibrating potentiometer 98 has therefore been inserted in this conductor 88 so that upon installation the total resistance of conductor 88 and potentiometer 98 may be adjusted to a predetermined maximum, equivalent, for example, to a one hundred twenty-five or one hundred fifty foot long conductor. The indicator needle 53 may be calibrated to read North, South, East, West, and North, for example, as shown in FIGURE 3, with the indicator needle indicating the South direction in FIGURES 1 to 4 and 7 and designed to indicate the North position with either end rotational limit. The circuit 60 of FIGURE 7 shows that the motor 63 and potentiometer 67 are energized in series across the secondary winding 92 with the voltage at the intermediate terminal 95 supposedly equal to the voltage of the potentiometer terminal 68, using the secondary end terminal 93 as a reference. Because the variations in conductor length are unknown at the time of manufacture and because manufacturing differences between different condensers 105 have been found in practice to effect a considerable difference in motor current, the balancing potentiometer 99 has been provided so that movement of the slider 111 can be made to establish terminal 68 at the same potential as the terminal 115 and therefore in effect simulate, as far as the meter 11 is concerned, the explanatory bridge condition wherein conductor 114 was utilized.

In practice, the meter 11 has been found to be quite linear because of the tapered pole shoes 34 and 35, because of the flux traversing the core portions 21 and 22 in series, and because of the calibrating and balancing potentiometers 98 and 99. Also, when the switch blade is moved to the central off position to de-energize the entire circuit, then both coils 13 and 14 are de-energized and the meter needle 53 is retained in its former indicating position because of the friction brake 15—48. This meter therefore has definite advantages over the prior type of meters because in such prior art meters, the force proportional to the quantity to be measured is generally resisted by a spring; and therefore, when the electrical quantity to be measured was removed from the meter, then such spring restored the meter needle to a zero or initial position. The present meter retains the formerly established meter indication and therefore it is not necessary to move the switch contact 102 in either direction to temporarily start the motor 63 merely to determine the present position of the antenna rotator device 77.

When the coil 13, for example, is supplied with maximum energization and the coil 14 with minimum energization, then the flux from coil 13 traverses the core portion 21, the pole shoe 34, the vane 15, and jumps an air gap 118 to the tongue 29 to return to the core portion 21 through the frame 12. This is a shunt path for the flux, and it will be noted that this shunt path is also followed in the opposite direction by the flux from the coil 14 when this coil 14 has greater energization than coil 13. At the neutral or balance position shown, the shunting flux is generally equal and opposite in the tongue 29 to thereby have substantially zero resultant flux, except for leakage.

The FIGURES 5 and 6 show an alternative construction of a meter 125 similar in many respects to the meter 11. The meter 125 has the coils 13 and 14 mounted on a permeable frame 126 which has an upstanding permeable tongue 127 for cooperation with a small semicircular vane portion 128 of a permeable vane 129. This vane also has a large radius vane portion 130 which cooperates with arcuate pole shoes 131 and 132 connected to the cores 133 and 134 for the coils 13 and 14. The pole shoes 131 and 132 are not as long in peripheral extent as in the structure of FIGURES 1–4, and it will be noted that the tongue 127 is disposed not between the cores 133 and 134 but on the side opposite, so that it is between the similarly tapered ends of the pole shoes 131 and 132.

The FIGURE 6 shows that the vane 129 is disposed below the median plane of the pole shoes 131 and 132 under the influence of gravity and is attached to a shaft 135 which permits rotation and axial movement of the vane 129. A disc 136 is carried fixedly with the shaft 135 and vane 129, as is the base 137 of indicator needle 138. A non-permeable support 139 on the frame 126 provides a journal for the shaft 135 at a second disc 140. Upon energization of the coils 13 and 14, the magnetic flux thereof pulls the vane 129 toward the median plane of the pole shoes 131 and 132 to release a friction brake previously applied by engagement of the needle base 137 with the disc 140 carried by the support 139. Thus, this meter 125 may be actuated and will operate essentially in the same manner as the meter 11.

The FIGURE 8 shows an alternative circuit arrangement 141 wherein the meter 11 again indicates the position of the antenna rotator device 77 utilizing the potentiometer 67. In this circuit 141 of FIGURE 8, a calibrating rheostat 142 is connected between the conductor 87 and the junction 108 of the meter coils 13 and 14. Also, a balancing rheostat 143 is connected in series between the coil terminal 115 and the secondary intermediate terminal 95. In this circuit 141 of FIGURE 8, the calibrating rheostat 142 may be adjusted to compensate for the different lengths of conductors 85, 86, 87, and 88 and for the different amounts of current through the motor 63, and the balancing rheostat 143 may be adjusted to establish the potential of the coil terminal 115 at a potential corresponding to the potential of the potentiometer terminal 68, using terminal 93 as a reference. Thus, the meter 11 of circuit 141 may be calibrated and adjusted to correctly read the position of the antenna rotator device 77.

Either of the meters 11 or 125 may be used in either of the circuits 69 and 141, and the antenna rotator device 77 is merely illustrative of one form of load which can be controlled from a remote location yet the position or other condition of the load can be determined at the remote location, the entire circuit using a minimum of interconnecting conductors for both control and indication, and the remote indicating meter maintaining the indicator position even when the meter and entire circuit is de-energized.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical meter, comprising, a magnetically permeable frame, a non-permeable body mounted on said frame, said body having an annular ring portion, first and second tapered arcuate magnetically permeable pole pieces mounted on the side of said annular ring portion remote from said frame, first and second magnetically permeable core members connected to said first and second pole pieces, respectively, magnetically permeable bridging members from said frame to the outer end of said core members, first and second coils surrounding said first and second core members, respectively, a shaft journalled relative to said frame generally coaxial with said annular ring portion and arcuate pole pieces, a magnetically permeable flat vane carried on said shaft, said vane having first and second semicircular portions of first and second different radii, respectively, an arcuate shoulder of approximately two hundred eighty degrees on said annular ring portion adjacent said pole pieces, a stop at each end of said arcuate shoulder generally adjacent said core members, magnetically permeable bridging means extending from said frame to a position adjacent said first semicircular vane portion, said first semicircular vane portion having a radius smaller than the radius of said arcuate shoulder and smaller than the distance to said permeable bridging means to have clearances therewith, said second semicircular vane portion having a radius smaller than the radius of said pole pieces to have a clearance therewith and larger than the radius of said arcuate shoulder, spring means mounted to urge said vane axially to urge said vane second semicircular portion into engagement with said arcuate shoulder as a friction brake, energization of at least one of said coils establishing a magnetomotive force acting on said vane to move same axially substantially into a median plane through the mid-portion of said pole pieces and hence relieve said frictional braking engagement between said vane second semicircular portion and said shoulder so as to permit rotation of said vane in accordance with the proportionate energization on said two coils.

2. An electrical meter, comprising, a flat magnetically permeable frame having a surface defining a central aperture, a non-permeable body mounted on one side of said frame covering said aperture, said body having an annular ring portion and having a disc portion contiguous to said frame and covering said aperture, a first shaft aperture centrally located in said disc portion and a tongue aperture near the inner periphery of said ring portion in said disc portion, first and second tapered magnetically permeable pole pieces mounted on the side of said annular ring portion remote from said frame and each circumscribing approximately one hundred seventy degrees of said ring portion, first and second magnetically permeable core members integral with said first and second pole pieces, respectively, and extending substantially parallel to the plane of said frame and at substantially a ninety degree angle between said core members, ears on said frame engaging the outer end of said core members, first and second coils surrounding said first and second core members, respectively, a non-permeable support mounted on said pole pieces and having a central second shaft aperture aligned with said first shaft aperture, a shaft journalled in said shaft apertures generally coaxial with said annular ring portion, a magnetically permeable flat vane fixedly carried on said shaft, said vane having first and second integral semicircular portions of first and second different radii, respectively, an arcuate shoulder of approximately two hundred eighty degrees on said annular ring portion adjacent said pole pieces, a stop at each end of said arcuate shoulder generally adjacent said core members, a magnetically permeable tongue on said frame extending through said tongue aperture to a position generally midway between said stops, said first semicircular vane portion having a radius smaller than the radius of said arcuate shoulder and smaller than the distance to said permeable tongue to have clearances therewith, said second semicircular vane portion having a radius smaller than the radius of said pole pieces to have a clearance therewith and larger than the radius of said arcuate shoulder, a leaf spring carried on said non-permeable support and engaging said shaft to urge said shaft and said vane axially to urge said vane second semicircular portion into frictional engagement with said arcuate shoulder as a friction brake, a meter indicating needle adapted to be mounted on said shaft, each of said coils having a substantially closed magnetic circuit extending successively through said frame, tongue and vane and through the respective pole piece core portion and frame ear, energization of at least one of said coils establishing a magnetomotive force acting on said vane to move same axially substantially into a median plane through the mid-portion of said pole pieces and hence relieve said frictional braking engagement between said vane second semicircular portion and said shoulder so as to permit rotation of said vane and shaft in accordance with the proportionate energization on said two coils.

3. A meter, comprising a frame, first and second magnetically permeable cores mounted on said frame in the same plane and disposed at an angle of approximately ninety degrees, first and second coils on said first and second cores respectively, a magnetically permeable rotor journalled in said frame on an axis substantially normal to said plane, first and second circular portions of smaller and larger radii, respectively, on said rotor, said second circular portion being approximately one hundred eighty degrees, first and second tapered pole faces on said first and second cores, respectively, said pole faces having a circular inner face on a radius from the axis of said rotor sufficiently larger than the radius of said second circular rotor portion to establish a relatively large air gap therebetween, said pole faces extending away from each other and each encompassing approximately one hundred sixty degrees substantially diametrically opposed in said plane, said rotor having a magnetic rotational neutral position disposed substantially equally adjacent said pole faces and lying adjacent approximately eighty degrees of each of said pole faces, a magnetically permeable bridge member joining the distal ends of said cores, a magnetically permeable shunt member extending from said bridge member to a position adjacent said first circular rotor portion, first and second alternating source terminals, means for energizing said coils in parallel from said source terminals, the bearings journalling said rotor permitting axial movement of said circular rotor portions from a first to a second position, said first position lying outside said plane and said second position lying generally in said plane, said circular rotor portions being biased in said first position with the magnetic circuit de-energized, energization of the magnetic circuit by said coils effecting movement of said circular rotor portions from said first to said second position, friction brake means acting between said rotor and said frame in said rotor first position to hold said rotor in any rotational position, electrical unbalance of energization of said coils effecting magnetic unbalance of flux flowing through said cores to thus rotationally shift said rotor in the second axial position thereof.

4. An electrical meter, comprising a magnetically permeable frame, a non-permeable annular ring portion on said frame, first and second magnetically permeable pole pieces on said frame, first and second coils on said frame cooperating with said pole pieces, a shaft journalled relative to said frame generally coaxial with said annular ring portion and pole pieces, a magnetically permeable vane carried on said shaft, said vane having first and second semi-circular portions of first and second different radii, respectively, an arcuate shoulder on said annular ring portion adjacent said pole pieces, said first semi-circular vane portion having a radius smaller than the radius of said arcuate shoulder to have a clearance therewith, said second semi-circular vane portion having a radius smaller than the radius of said pole pieces to have a clearance therewith and larger than the radius of said arcuate shoulder, spring means mounted to urge said vane axially to urge said vane second semi-circular portion into engagement with said arcuate shoulder as a friction brake, energization of at least one of said coils establishing a magnetomotive force acting on said vane to move same axially substantially into a median plane through the mid-portion of said pole pieces and hence relieve said frictional braking engagement between said vane second semi-circular portion and said shoulder so as to permit rotation of said vane in accordance with the proportionate energization on said two coils.

5. An electrical meter, comprising a magnetically permeable frame, a non-permeable body mounted on said frame, said body having an annular ring portion, first and second magnetically permeable pole piece mounted on the side of said annular ring portion remote from said frame, first and second coils on said frame cooperating with said pole pieces, a shaft journalled relative to said frame generally coaxial with said annular ring portion and pole pieces, a magnetically permeable flat vane carried on said shaft, said vane having first and second semi-circular portions of first and second different radii, respectively, an arcuate shoulder of approximately two hundred eighty degrees on said annular ring portion adjacent said pole pieces, a stop at each end of said arcuate shoulder generally adjacent said core members, said first semi-circular vane portion having a radius smaller than the radius of said arcuate shoulder to have a clearance therewith, said second semi-circular vane portion having a radius smaller than the radius of said pole pieces to have a clearance therewith and larger than the radius of said arcuate shoulder, spring means mounted to urge said vane axially to urge said vane second semi-circular portion into engagement with said arcuate shoulder as a friction brake, energization of at least one of said coils establishing a magnetomotive force acting on said vane to move same axially substantially into a median plane through the mid-portion of said pole pieces and hence relieve said frictional braking engagement between said vane second semi-circular portion and said shoulder so as to permit rotation of said vane in accordance with the proportionate energization on said two coils.

6. A meter, comprising a frame, first and second magnetically permeable cores mounted on said frame in the same plane and disposed at an angle of approximately ninety degrees, first and second coils on said first and second cores, respectively, a magnetically permeable rotor journalled in said frame on an axis substantially normal to said plane, first and second circular portions of smaller and larger radii, respectively, on said rotor, said second circular portion being approximately one hundred eighty degrees, first and second tapered pole faces on said first and second cores, respectively, said pole faces having a circular inner face on a radius from the axis of said rotor sufficiently larger than the radius of said second circular rotor portion to establish a relatively large air gap therebetween, said pole faces extending away from each other and substantially diametrically opposed in said plane, said rotor having a magnetic rotational neutral position disposed substantially equally adjacent said pole faces, a magnetically permeable bridge member joining the distal ends of said cores, a magnetically permeable shunt member extending from said bridge member to a position adjacent said first circular rotor portion, first and second alternating current source terminals, means for energizing said coils in parallel from said source terminals, the bearings journalling said rotor permitting axial movement of said circular rotor portions from a first to a second position, said first position lying outside said plane and said second position lying generally in said plane, said circular rotor portions being biased in said first position with the magnetic circuit de-energized, energization of the magnetic circuit by said coils effecting movement of said circular rotor portions from said first to said second position, friction brake means acting between said rotor and said frame in said rotor first position to hold said rotor in any rotational position, electrical unbalance of energization of said coils effecting magnetic unbalance of flux flowing through said cores to thus rotationally shift said rotor in the second axial position thereof.

(References on following page)

References Cited in the file of this patent

UNITED STATES PATENTS

| | | |
|---|---|---|
| 2,040,060 | Middleton | May 5, 1936 |
| 2,171,183 | Lamb | Aug. 29, 1939 |
| 2,425,203 | Grieg | Aug. 26, 1947 |
| 2,426,383 | Anderson | Aug. 26, 1947 |
| 2,450,331 | De Giers | Sept. 28, 1948 |
| 2,463,681 | De Giers | Mar. 8, 1949 |
| 2,488,122 | Griffith | Nov. 15, 1949 |
| 2,498,726 | Towner | Feb. 28, 1950 |
| 2,507,801 | Middleton | May 16, 1950 |
| 2,677,256 | Donandt | May 4, 1954 |